United States Patent
Ernst

(10) Patent No.: US 10,738,807 B2
(45) Date of Patent: Aug. 11, 2020

(54) CLIP ELEMENT AND COMPONENT CONNECTION

(71) Applicant: Bayerische Motoren Werke Aktiengesellschaft, Munich (DE)

(72) Inventor: Mario Ernst, Geisenhausen (DE)

(73) Assignee: Bayerische Motoren Werke Aktiengesellschaft, Munich (DE)

(*) Notice: Subject to any disclaimer, the term of this patent is extended or adjusted under 35 U.S.C. 154(b) by 0 days.

(21) Appl. No.: 14/516,086

(22) Filed: Oct. 16, 2014

(65) Prior Publication Data

US 2015/0096155 A1    Apr. 9, 2015

Related U.S. Application Data

(63) Continuation of application No. PCT/EP2013/054728, filed on Mar. 8, 2013.

(30) Foreign Application Priority Data

Apr. 26, 2012  (DE) .................. 10 2012 206 934

(51) Int. Cl.
  *F16B 2/02*  (2006.01)
  *F16B 5/06*  (2006.01)
  (Continued)

(52) U.S. Cl.
  CPC ............. *F16B 2/02* (2013.01); *A44B 17/0064* (2013.01); *F16B 5/0657* (2013.01);
  (Continued)

(58) Field of Classification Search
  CPC ........ F16B 2/02; F16B 5/0657; F16B 5/0664; F16B 21/075; F16B 2/22; F16B 2/20;
  (Continued)

(56) References Cited

U.S. PATENT DOCUMENTS 1,675,790 A * 7/1928 Carr ..................... F16B 5/0642
  24/289
4,716,633 A * 1/1988 Rizo .................. B60R 13/0206
  24/297

(Continued)

FOREIGN PATENT DOCUMENTS

CN    201575009 U    9/2010
DE    32 32 926 A1   3/1984
  (Continued)

OTHER PUBLICATIONS

International Search Report (PCT/ISA/210) dated Jun. 25, 2013, with English translation (Seven (7) pages).
(Continued)

*Primary Examiner* — Victor D Batson
*Assistant Examiner* — Matthew J Sullivan
(74) *Attorney, Agent, or Firm* — Crowell & Moring LLP

(57) ABSTRACT

A mushroom-shaped clip with a hollow, radially elastic sleeve section and a clamping edge protruding outwardly from the shank. The clip element being used in a component connection having a first component having a projecting male form-fitting element; a second component having a through-hole into which the male form-fitting element projects; and a clip element comprising a radially elastic sleeve section and a clamping edge projecting outward from the sleeve section, wherein the sleeve section is form-fittingly and/or frictionally clipped onto the male form-fitting element, and the clamping edge extends at least partially over the through-hole of the second component and rests against a side of the second component facing away from the first component or is fixedly connected with the second component.

11 Claims, 5 Drawing Sheets

(51) Int. Cl.
    *F16B 21/07*     (2006.01)
    *A44B 17/00*     (2006.01)
    *F16B 2/22*     (2006.01)

(52) U.S. Cl.
    CPC .......... *F16B 5/0664* (2013.01); *F16B 21/075* (2013.01); *F16B 2/22* (2013.01); *Y10T 24/45225* (2015.01)

(58) Field of Classification Search
    CPC ................ F16B 2/205; A44B 17/0064; Y10T 24/45225; Y10T 24/309; Y10T 24/44026; Y10T 24/45775
    See application file for complete search history.

(56) References Cited

U.S. PATENT DOCUMENTS

| | | | | |
|---|---|---|---|---|
| 5,387,065 | A * | 2/1995 | Sullivan | F16B 19/1081 411/45 |
| 5,580,204 | A * | 12/1996 | Hultman | F16B 5/065 24/297 |
| 5,629,823 | A | 5/1997 | Mizuta | |
| 5,718,549 | A * | 2/1998 | Noda | F16B 5/0635 411/349 |
| 5,795,118 | A * | 8/1998 | Osada | B29C 65/0672 411/171 |
| 6,324,731 | B1 * | 12/2001 | Pliml, Jr. | F16B 19/1081 24/297 |
| 7,828,372 | B2 * | 11/2010 | Ellison | B60R 13/04 24/297 |
| 8,776,326 | B2 * | 7/2014 | Clarke | B60R 13/0206 24/297 |
| 2011/0296764 | A1 | 12/2011 | Sawatani et al. | |
| 2014/0298638 | A1 * | 10/2014 | Colombo | B23P 19/04 29/525.01 |

FOREIGN PATENT DOCUMENTS

| | | | |
|---|---|---|---|
| DE | 42 13 366 A1 | 10/1993 | |
| EP | 1 104 689 A1 | 6/2001 | |
| FR | 2 629 527 A1 | 10/1989 | |
| FR | 2980444 A1 * | 3/2013 | ............. B60J 1/006 |
| GB | 1023511 | 3/1966 | |
| WO | WO 2011/068769 * | 6/2011 | ......... B60R 13/0206 |
| WO | WO 2014082848 A1 * | 6/2014 | ............ F16B 5/0642 |
| WO | WO-2015104120 A1 * | 7/2015 | ............. B23K 31/02 |

OTHER PUBLICATIONS

Chinese Office Action issued in counterpart Chinese Application No. 201380006322.0 dated Nov. 20, 2015, with English translation (Nine (9) pages).

Chinese Office Action dated May 6, 2015, with English translation (Twelve (12) pages).

Chinese-language Office Action issued in counterpart Chinese Application No. 201380006322.0 dated May 30, 2016 with English translation (11 pages).

German-language Examination Report issued in counterpart European Application No. 13708173.3 dated Jan. 20, 2017 (Four (4) pages).

* cited by examiner

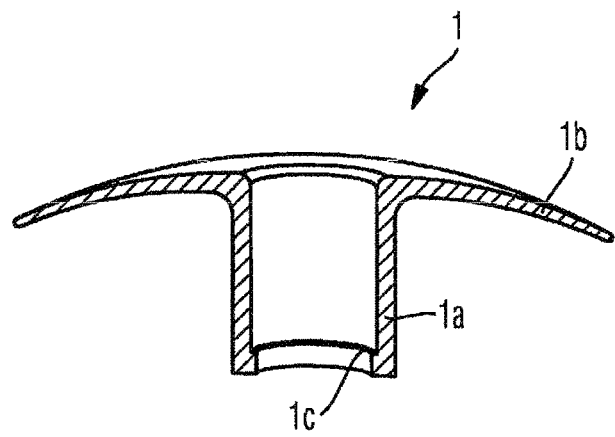
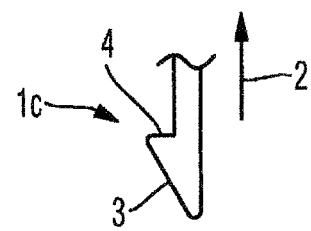
Fig. 1    Fig. 1a
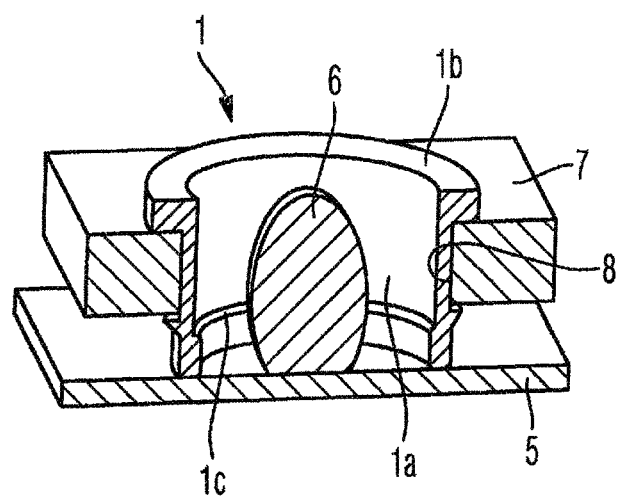
Fig. 2
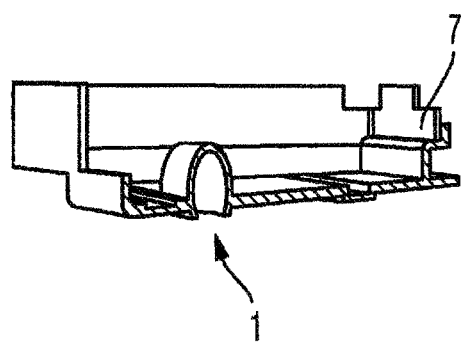
Fig. 3

CLIP ELEMENT AND COMPONENT CONNECTION

CROSS REFERENCE TO RELATED APPLICATIONS

This application is a continuation of PCT International Application No. PCT/EP2013/054728, filed Mar. 8, 2013, which claims priority under 35 U.S.C. § 119 from German Patent Application No. 10 2012 206 934.8, filed Apr. 26, 2012, the entire disclosures of which are herein expressly incorporated by reference.

This application contains subject matter related to U.S. application Ser. No. 14/516,057, entitled "Method for Connecting Two Components, and Component Connection" filed on Oct. 16, 2014.

BACKGROUND AND SUMMARY OF THE INVENTION

The present invention relates to a clip element for forming a component connection, as well as to the component connection so formed with the clip element.

It is an object of the invention to provide a clip element, which permits a connection of components in a simple fashion, as well as to provide a corresponding component connection with the clip element.

This and other objects are achieved by providing a clip element having a mushroom-shape with a hollow, radially elastic sleeve and a clamping edge projecting from the shank to the outside, as well as a component connection formed with the clip element. The component connection includes a first component, from which a male form-fitting element projects, a second component having a through-hole into which the male form-fitting element projects, and the clip element. The clip element has the radially elastic sleeve section, which is form-fittingly and/or frictionally clipped onto the male form-fitting element, and the clamping edge which projects to the outside from the sleeve section and reaches at least partially over the through hole. The clamping edge rests against the second component on a side of the second component facing away from the first component or is fixedly connected with the second component.

The starting point of the invention is a component connection having a first component and a second component to be connected therewith by way of a fitting or clamped connection. One or both components may, for example, be vehicle body components. However, the invention is not limited to the "automotive engineering" field but can be used quite generally wherever two components are to be connected with one another in a simple and cost-effective manner by way of a fitting or clamped connection.

A "male form-fitting element" projects from the first component. The term "male form-fitting element" should be interpreted extremely broadly. Generally, it applies to an element that projects from the first component and preferably has an undercut. The male form-fitting element may, for example, be a sphere or may be formed by a part of a sphere (for example, a spherical cap) or have a shape similar to a sphere or a conical shape or the shape of a pin.

A through-hole is provided in the second component. The male form-fitting element projects into the through-hole, or the male form-fitting element at least partially fits through the through-hole.

The invention includes a clip element interacting with the male form-fitting element. The clip element may, for example, be designed in the shape of a mushroom or a hat or may be integrated in another component. The clip element has a hollow, radially elastic sleeve section. A clamping edge may project toward the outside from the sleeve section.

In the case of a component connection according to the invention, the radially elastic, sleeve section (shank) may be form-fittingly and/or frictionally clipped onto the male form-fitting element. The male form-fitting element has a certain oversize with respect to at least a forward section of the sleeve section. During the fitting or clipping of the sleeve section onto the male form-fitting element, the forward section of the sleeve section is first expanded slightly radially. When the sleeve section is pressed farther onto the male form-fitting element, if the male form-fitting element has an undercut, the forward section of the sleeve section can radially spring back again a certain distance into the interior, whereby a certain tight fit is obtained, in addition to the frictional connection between the inner circumference of the sleeve section of the clip element and the male form-fitting element. It may also be provided that the sleeve section of the clip element in the clipped-on condition, in a form-fitting manner, reaches behind an undercut of the clip element.

It may be provided that a "clamping edge" projects from the sleeve section (shank section) toward the outside. This clamping edge at least partially reaches or extends over the through-hole. Preferably, the clamping edge, to a certain extent, is flexible at least in the longitudinal direction of the sleeve section.

It is further provided that, on a side of the second component facing away from the first component, the clamping edge rests against the second component and presses the latter in the direction of the first component. As an alternative, it may be provided that the clamping edge is fixedly connected with the second component.

In each of the two above-described cases, the second component is connected with the first component by way of the clip element, which is fixedly clipped to the male form-fitting element fixedly connected with the first component.

The two components can therefore very easily be mutually connected by the clipping or fitting of the clip element onto the male form-fitting element fixedly connected with the first component. The clipping-on can be carried out manually. As an alternative, it may also be provided that the clip element is clipped on in an automated manner, for example, by way of a robot, which has previously determined the spatial position of the male form-fitting element.

According to a further development of the invention, the through-hole provided in the second component is circular. Correspondingly, it may be provided that the sleeve section of the clip element (i.e. shank section) has the shape of a circular cylinder or a shape similar to that of a circular cylinder.

As an alternative, it may be provided that the through-hole is an oblong hole and the sleeve section has the shape of a cylinder adapted to the shape of the oblong hole. However, the shape of the sleeve section does not necessarily have to be adapted to the shape of the oblong hole. It is also contemplated that the through-hole is designed as an oblong hole and a clip element is used that has a circular-cylindrical shank section, which has the advantage that, in the longitudinal direction of the oblong hole, even in the mounted condition of the two components, a certain relative displacement of the two components is possible.

If the clamping edge is connected with the second component, it may be provided that the clamping edge is connected in one piece with the second component. In particular, it may be provided that the clamping edge and/or the entire clip element is connected in one piece with the second component and/or is integrated in the second component and is therefore an integral part of the second component.

Corresponding to the shape of a mushroom head, it may be provided that the clamping edge is a surrounding clamping edge. However, this does not necessarily have to be so. "The clamping edge" could also be formed by several clamping segments, several clamping arms, clamping noses or the like, which extend about a circumferential section.

According to the invention, the sleeve section (shank section) of the clip element is open on its front side facing away from the clamping edge. This is necessary for being able to fit the sleeve section onto a male form-fitting element. The other end of the sleeve section may also be open or closed. In the latter case, it may be provided that, corresponding to the shape of a mushroom head, the clamping edge extends over the sleeve section.

As mentioned above, the male form-fitting element may be formed, for example, by a sphere connected with the first component. It is also contemplated that the male form-fitting element is formed by several individual mutually connected elements, particularly by several individual mutually connected spherical or sphere-like elements. In the case of several spherical elements, these can be arranged one behind another (double or multiple spheres). The male form-fitting element may be connected with the first component in a firmly bonded manner. In particular, it may be welded onto the first component. The first component and/or the male form-fitting element may, for example, consist of metal, particularly of steel or aluminum. The second component may also consist of metal. However, a mixed construction is also contemplated, i.e. a component connection in which the two components consist of different materials. In particular, component connections may be considered where one of the components consists of metal and the other component consists of a plastic material, such as a fiber-reinforced plastic material, particularly a glass- or carbon-fiber-reinforced plastic material.

The clip element may preferably also be produced of a plastic material. The clip element may, for example, by an injection-molded part.

Other objects, advantages and novel features of the present invention will become apparent from the following detailed description of one or more preferred embodiments when considered in conjunction with the accompanying drawings.

BRIEF DESCRIPTION OF THE DRAWINGS

FIG. 1 is a view of an embodiment of a clip element having a mushroom-shaped head;
FIG. 1a is an extracted view of a portion of FIG. 1;
FIG. 3 is a view of a second component, in which a clip element according to the invention is integrated.

DETAILED DESCRIPTION OF THE DRAWINGS

Figure 2A:
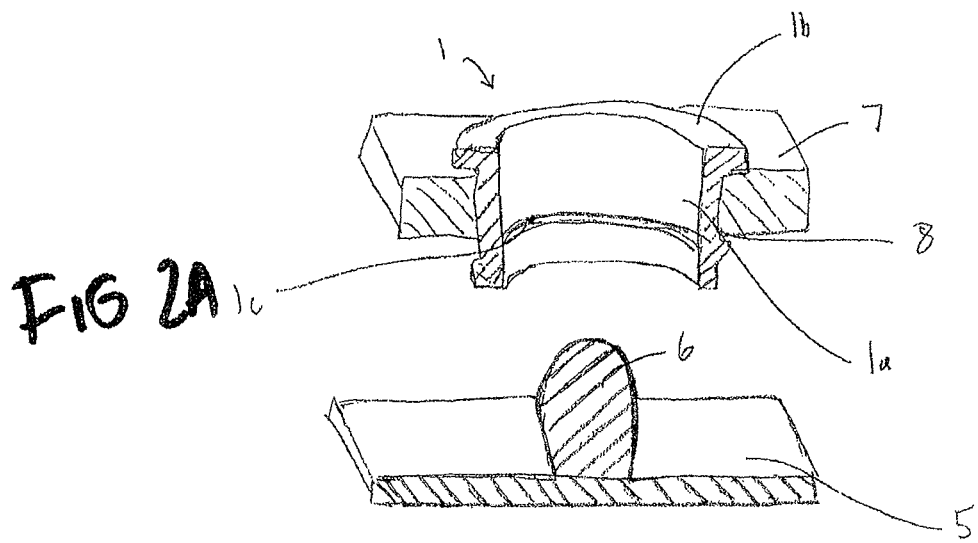
FIG. 2 is a view of an embodiment of a component connection according to the invention.

FIG. 1 illustrates a mushroom-shaped clip element 1, which has a hollow, radially elastic or sleeve section (shank) 1a and a head clamping section 1b that projects outwardly from the sleeve section and extends over the entire circumference of the sleeve section 1a. The clamping section 1b is preferably flexible in a longitudinal direction of the sleeve section 1a, i.e. about axes which are perpendicular to the longitudinal direction of the sleeve section 1a.

The clip element 1 may, for example, be made of a plastic material. In the embodiment illustrated in FIG. 1, a circumferential step 1c is provided at an inner circumference of the sleeve section 1a. This step 1c has a slightly smaller diameter than the inner circumference of the sleeve section 1a above the step 1c. The difference in diameter may be in the range of several hundredths or several tenths of a millimeter.

The clip element illustrated in FIG. 1 is provided for being clipped onto a male form-fitting element which may, for example, have the shape of a sphere or a sphere-like shape. With respect to the diameter of the step 1c, the male form-fitting element (not shown) has a certain oversize. If the clip element 1 is to be clipped onto such a male form-fitting element, a certain expenditure of force is required. For this purpose, the clip element 1 is fitted in the longitudinal direction of the sleeve section onto the male form-fitting element. In this case, the forward section of the sleeve section 1a is expanded radially to the outside until the step 1c (compare also FIG. 1a) has slid over the "largest diameter" of the male form-fitting element. If the male form-fitting element has an undercut, the step 1c snaps together with the undercut of the male form-fitting element.

As illustrated in the enlarged FIG. 1a, the step 1c has a slope 3 extending circumferentially from the side of the sleeve section 1a facing away from the clamping edge 1b, which makes it possible to clip the clip element with relatively low expenditures of force onto a male form-fitting element. In contrast, the clip element 1 can be pulled off the male form-fitting element only by means of a clearly higher expenditure of force because no such slope is provided in the pull-off direction 2 (compare FIG. 1a). Details of the geometrical further development of the step 1c are illustrated in FIG. 1a. The "fitting-on slope" 3 and the form-fitting surface 4 extending perpendicularly to the longitudinal direction of the sleeve section 1a are clearly visible.

The clip element 1 illustrated in FIG. 1 can be used for connecting two components. A male form-fitting element (for example, a sphere welded onto the first component) projects from the first component. The second component has a through-hole, into which the male form-fitting element projects. After the joining of the two components, the clip element 1 only has to be clipped by way of its sleeve section 1a onto the male form-fitting element. The through-hole provided in the second component and the clamping edge 1b are mutually coordinated such that the clamping edge 1b reaches over the through-hole, whereby the two components are mutually connected.

Figure 2B:
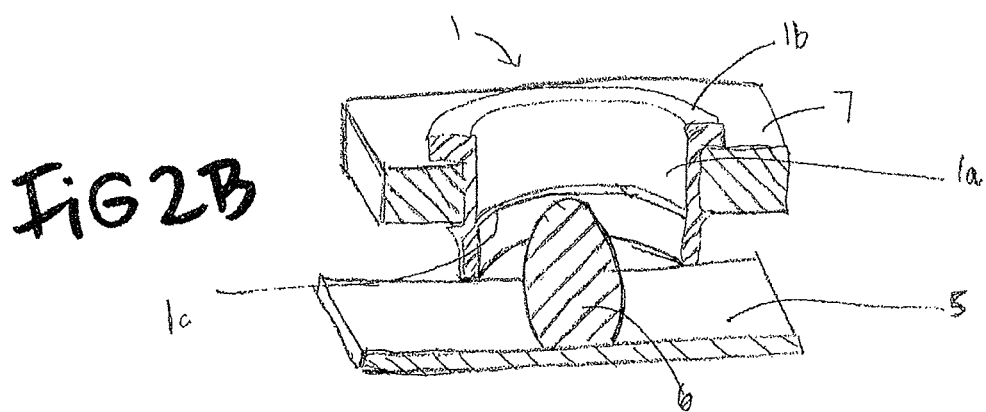
Figure 2C:
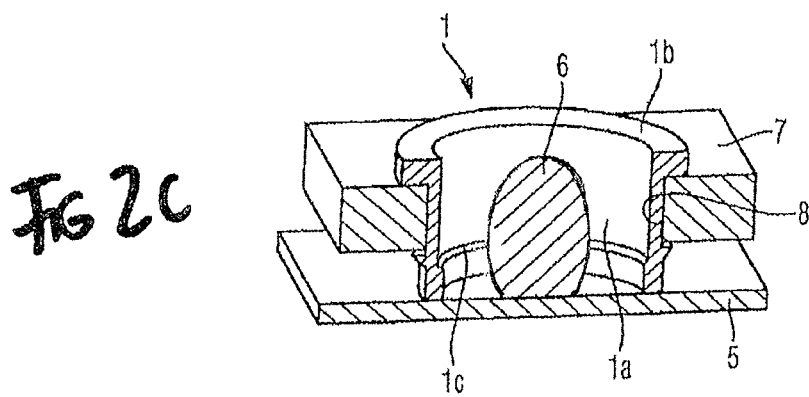

FIG. 2 illustrates an embodiment of such a component connection. The component connection has a first component 5, from which an ellipsoid-type male form-fitting element 6 projects. An oblong-type through-hole 8 is provided in a second component 7.

Here, a clip element 1 is clipped onto the male form-fitting element 6, which clip element 1 has a sleeve section 1a and a clamping edge 1b reaching over the through-hole 8. As illustrated in FIG. 2, the clip element 1, particularly its sleeve section 1a, is adapted to the shape of the oblong hole. The clip element or the step 1c of the clip element 1 reaches behind the male form-fitting element here only on two mutually opposite sides, specifically in an area within the plane of the drawing and in an area in front of the plane of the drawing. Transversely thereto, the second component 7 or the clip element 1 inserted into its through-hole 8 can be displaced relative to the first component 5.

FIG. 3 illustrates an embodiment of a second component 7, into which a clip element 1 is integrated. The second component 7 and the clip element 1 can be cast or injection-molded from a plastic material. In the embodiment illustrated in FIG. 3, the clip element 1 is therefore an integral part of the second component 7.

Figure 4:
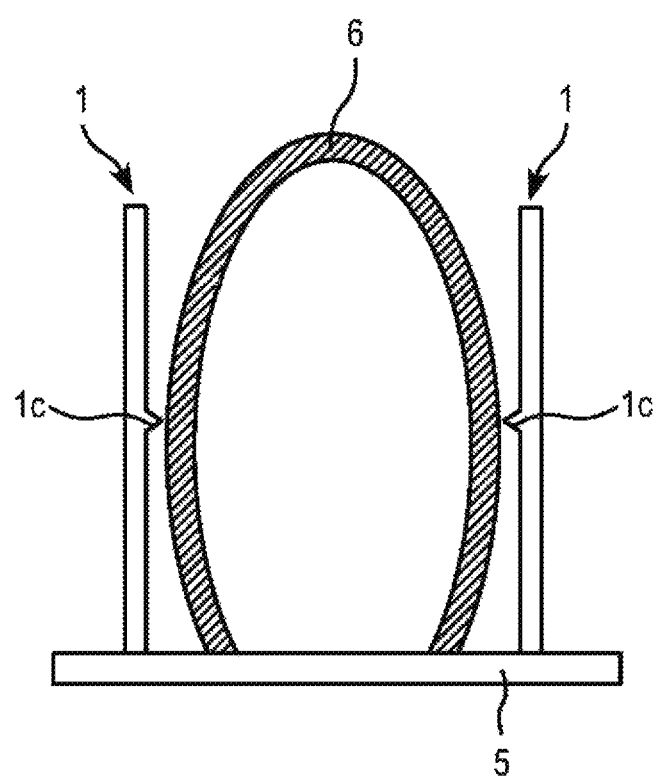
FIG. 4 shows male formfitting element interacting eith a step
Figure 5:
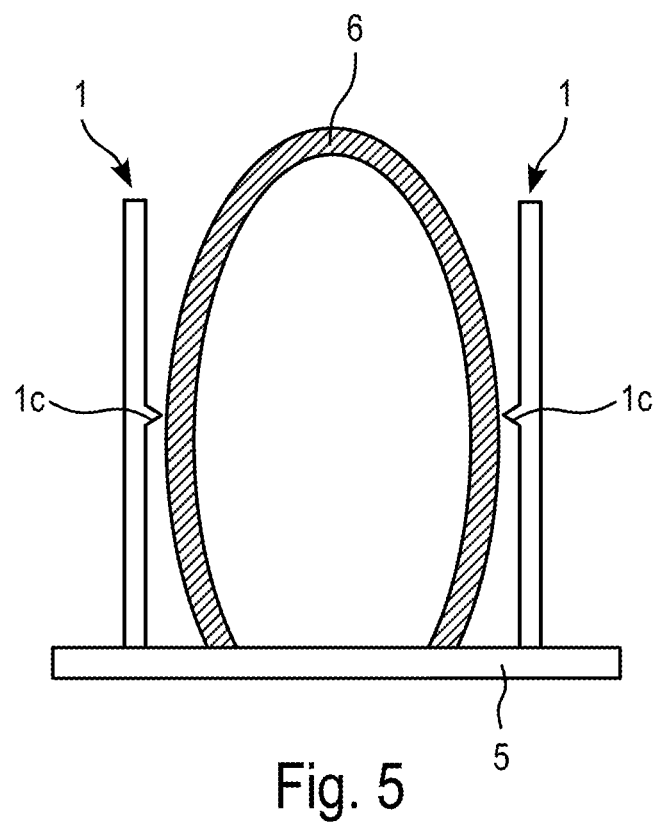
Figure 6:
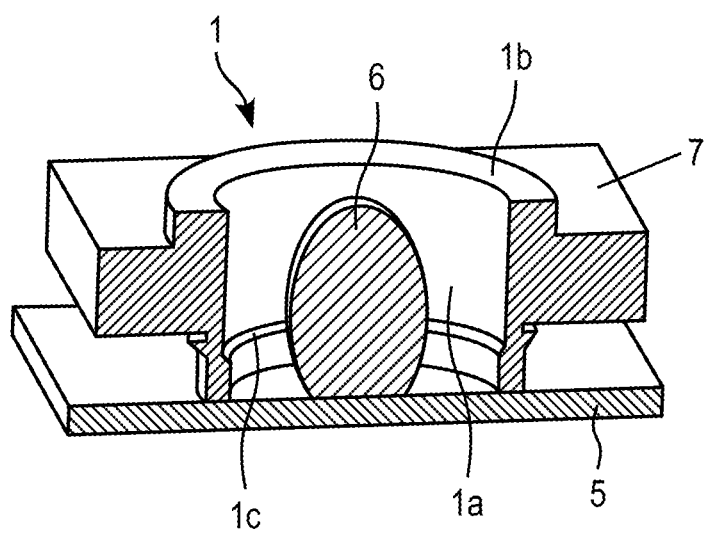

As shown in FIG. 4, the male form-fitting element 6 may have a shape of a sphere. Further, as shown in FIG. 5, the step 1*c* of the clip element 1 may reach behind the male form-fitting element 6 only on two mutually opposite sides thereof. As shown in FIG. 6, the clamping edge 1*b* may be formed in one piece with the second component 7. As shown in FIG. 4, male formfitting element 6 is capable of reaching behind step 1*c*.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof

What is claimed is:

1. A component connection comprising:
   a first component;
   a male form-fitting element;
   a weld that is disposed between, and is in direct contact with, the first component and the male form-fitting element, the weld permanently joining the first component and the male form-fitting element, the male form-fitting element protruding from the first component;
   a second component which has a through-hole into which the male form-fitting element projects;
   a clip element which has a sleeve portion which is radially elastic and which is clipped in a form-fitting manner and/or frictionally onto the male form-fitting element;
   a clamping edge which protrudes outwards from the sleeve portion and which at least partially reaches across the through-hole and lies against the second component on a side of the second component which is distant from the first component, or is connected securely to the second component, the clamping edge being flexurally elastic about axes which are perpendicular to a longitudinal direction of the sleeve portion; and
   a step which is circumambient in a peripheral direction and which is provided on an inner periphery of the sleeve portion, wherein
      the sleeve portion is open at its two end faces, and
      the step reaches behind the male form-fitting element only on two mutually opposite sides thereof.

2. The component connection according to claim 1, wherein the through-hole is circular and the sleeve portion has a circular cylinder shape.

3. The component connection according to claim 1, wherein the through-hole is an oblong hole along a longitudinal direction of the second component and the sleeve portion has a cylindrical shape that is complimentary to the shape of the oblong hole.

4. The component connection according to claim 1, wherein the clamping edge is formed in one piece with the second component.

5. The component connection according to claim 1, wherein the clamping edge is a circumambient clamping edge.

6. The component connection according to claim 1, wherein the clamping edge has a mushroom shape.

7. The component connection according to claim 1, wherein the male form-fitting element has a plurality of spherical elements or portions.

8. The component connection according to claim 7, wherein the plurality of spherical elements or portions are arranged in a row one behind another.

9. The component connection according to claim 1, wherein at least one of the first and second components is a vehicle body component.

10. The component connection according to claim 1, wherein the clip element is made of a plastic material.

11. A component connection comprising:
    a first component;
    a male form-fitting element;
    a weld that is disposed between, and is in direct contact with, the first component and the male form-fitting element, the weld permanently joining the first component and the male form-fitting element, the male form-fitting element protruding from the first component;
    a second component which has a through-hole into which the male form-fitting element projects;
    a clip element which has a sleeve portion which is radially elastic and which is clipped in a form-fitting manner and/or frictionally onto the male form-fitting element;
    a clamping edge which protrudes outwards from the sleeve portion and which at least partially reaches across the through-hole and lies against the second component on a side of the second component which is distant from the first component, or is connected securely to the second component, the clamping edge being flexurally elastic about axes which are perpendicular to the longitudinal direction of the sleeve portion; and
    a step which is circumambient in the peripheral direction and which is provided on an inner periphery of the sleeve portion, wherein
       the male form-fitting element has a shape of an ellipsoid, and
       the sleeve portion is open at its two end faces, and
       the step reaches behind the male form-fitting element only on two mutually opposite sides thereof.

* * * * *